(12) United States Patent
Adams

(10) Patent No.: US 6,378,130 B1
(45) Date of Patent: Apr. 23, 2002

(54) MEDIA SERVER INTERCONNECT ARCHITECTURE

(75) Inventor: Michael Brian Adams, Castle Rock, CO (US)

(73) Assignee: Time Warner Entertainment Company, Stamford, CT (US)

( * ) Notice: Subject to any disclaimer, the term of this patent is extended or adjusted under 35 U.S.C. 154(b) by 0 days.

(21) Appl. No.: 08/954,672

(22) Filed: Oct. 20, 1997

(51) Int. Cl.[7] .............................. H04N 7/173; G06F 5/16
(52) U.S. Cl. .............................. 725/95; 725/96; 725/93; 709/219
(58) Field of Search ..................... 395/200.47; 345/327; 348/12, 13, 6, 7, 10; 455/5.1, 6.1, 6.2, 6.3, 3.1, 4.2; 709/226, 219; 725/95, 94, 93, 96, 91, 116, 114, 117; H04N 7/10, 7/14, 7/175; G06F 5/16

(56) References Cited

U.S. PATENT DOCUMENTS

| | | | |
|---|---|---|---|
| 5,195,092 A | * 3/1993 | Wilson et al. | 348/13 |
| 5,557,316 A | * 9/1996 | Hoarty et al. | 348/12 |
| 5,589,892 A | * 12/1996 | Knee et al. | 348/906 |
| 5,608,448 A | * 3/1997 | Smoral et al. | 348/13 |
| 5,675,738 A | * 10/1997 | Suzuki et al. | 348/12 |
| 5,781,228 A | * 7/1998 | Sposato | 348/13 |
| 5,812,665 A | * 9/1998 | Hoarty et al. | 348/7 |
| 5,850,218 A | * 12/1998 | LaJoie et al. | 345/327 |
| 5,877,755 A | * 3/1999 | Hellhake | 345/327 |
| 5,881,245 A | * 3/1999 | Thompson | 348/12 |
| 5,884,038 A | * 3/1999 | Kapoor | 395/200.47 |

* cited by examiner

Primary Examiner—Andrew Faile
Assistant Examiner—Vivek Srivastava
(74) Attorney, Agent, or Firm—Holland & Hart LLP

(57) ABSTRACT

An improved media server interconnect to subscriber terminals is accomplished with a plurality of media servers at a headend where each media server provides one or more programs for distribution to the subscriber terminals. An array of modulators connects a requested media asset, such as a video program or WEB page, from a media server to a requesting subscriber terminal. A connection manager responds to a media asset request from the requesting subscriber terminal and selects a source server to provide the requested media asset and selects a modulator in the array to send the requested media asset from the source server to the requesting subscriber terminal. The array of modulators acts as a two stage switch between the source server and the requesting subscriber terminal. A selected modulator in said array is the switch point in the two stage switch. The connection manager controls a first stage of the switch by selecting the selected modulator to receive the requested media asset from the source server. The requesting subscriber terminal acts as a second stage of the two stage switch also under the control of the connection manager by tuning to the channel frequency of the selected modulator.

11 Claims, 7 Drawing Sheets

MEDIA SERVER INTERCONNECT ARCHITECTURE

BACKGROUND OF THE INVENTION

1. Field of the Invention

This invention relates to a server interconnect architecture for supplying Broadband On-Demand Services (for example, Video-On-Demand (VOD), WEB browsing, etc.) in a communication network to residential or business communication services subscribers. More particularly, this invention relates to selectively interconnecting a plurality of media servers at a headend in the communication network to subscriber terminals attached to the network.

2. Description of the Related Art

The state of the art in the delivery of entertainment services and other services to subscribers is exemplified by a full service network described in copending, commonly-assigned U.S. patent application Ser. No. 08/802,833, filed Feb. 19, 1997, entitled "System and Method For Providing A Full Service Television System" invented by M. L. LaJoie et al. One embodiment of the LaJoie et al full service network or cable system is shown in FIG. 1 herein.

As illustrated in FIG. 1, a preferred full service network 1 comprises five primary components: a headend 2; at least one fiber transport 3, at least one distribution hub 4; at least one hybrid fiber coax plant 5; and a plurality of set-top terminals 6. The set-top terminal 6 is a subscriber terminal in the cable network. A subscriber terminal is any device connected to a cable network that provides security, navigation and other services to a subscriber. The subscriber terminal may be a standalone set-top, or incorporated into a television, Personal Computer, DVD (Digital Video Disk) player, or other subscriber equipment.

Headend 2 provides the primary source of services and control of system 1. Programs, services and control signals are delivered to the subscribers' set-top terminals 6 from headend 2 by transmitting signals through fiber transport 3, distribution hub 4, and hybrid fiber coax plant 5.

The subscribers may also interact with the services and programming provided by headend 2. This is accomplished by set-top terminals 6 in the subscribers' homes transmitting signals back through hybrid fiber coax 5, distribution hub 4, and fiber transport 3 to headend 2. In this way, a two-way, interactive, full service network is provided.

In order to provide the services and control of system 1, headend 2 includes a plurality of digital satellite receivers 10, a Broadcast Cable Gateway (BCG) 11, a plurality of analog receivers 12, a plurality of Integrated Receiver Decoders (IRD) 13, analog scrambling and modulation circuitry 20, an Addressable Controller (AC) 14, a plurality of application servers 15, a plurality of media servers 16, a digital switch or multiplexer 17, and an Interactive Cable Gateway (ICG) 18.

The programs and services generated by headend 2 are received from primary sources: Digital satellite transmissions from digital service providers, analog satellite transmissions from analog service providers, application services on application servers 15, and media services on media servers 16. Digital and analog services provide the more traditional forms of television broadcast services, including services such as television programs and information services. Application servers provide services, such as database services, network management services, transactional electronic commerce services, system administration console services, application specific services (such as stock ticker, sport ticker, and weather), resource management services, connection management services, subscriber care services, billing services, operation system services, and object management services. Media servers provide time-critical media assets including MPEG-2 encoded video and audio, MPEG-2 encoded still images, WEB pages, bit-mapped graphic images, PCM digital audio, application programs, and application data files. A media asset is defined as a collection of one or more of these stream or file types together with the associated meta-data that binds them together.

In order to provide this multitude of cable services to subscribers over the cable network, the signals are modulated onto a plurality of 6 MHz Frequency Division Multiplexed (FDM) channels in the RF Spectrum from 5 MHz through 860 MHz. More specifically, the 6 MHz FDM channels can be used to carry analog channels with Vertical Blanking Interval (VBI) signals, Forward Application Transport (FAT) channels, Forward Data Channels (FDC), and Reverse Data Channels (RDC). The frequencies of the analog channels are in the range of 50 to 500 MHz, the FAT channels are in the range of 50 to 750 MHz, and the RDCs and FDCs are in the ranges of 5 to 40 MHz and 50 to 750 MHz, respectively.

Digital services are received from satellites by digital satellite receivers 10. The signals received by digital satellite receivers 10 arrive in a Quadrature Phase Shift Key (QPSK) modulated, encrypted MPEG-2 transport stream format. Once the satellite signals have been received by the digital satellite receivers, Broadcast Cable Gateway (BCG) 11 converts the signals for transmission over the cable system's communication network under the control of addressable controller 14. Broadcast Cable Gateway 11 demodulates, applies Forward Error Correction (FEC), if desired, and decrypts the satellite transmission to recover an MPEG-2 transport stream. The MPEG-2 stream is then manipulated by BCG 11 to remove unwanted programs from the stream to form an MPEG-2 payload. BCG 11 then encrypts the payload (if desired), adds FEC and modulates the payload onto a Forward Application Transport (FAT) 6 MHz FDM channel. The modulation used on the FAT channels is preferably 64 or 256 Quadrature Amplitude Modulation (QAM) which enables the channels to carry digital data at rates typically in the range of 27 or 38 Mbps, respectively.

Analog programs and services are received from satellite transmissions by receivers 12 and processed by integrated receiver decoders 13 and analog scrambler and modulator 20. Analog satellite receivers 12 typically receive the satellite transmissions from the analog service providers in a modulated and scrambled NTSC format. Integrated receiver decoders 13 demodulate and descramble the satellite signals into NTSC signals, and then analog scrambler and modulator 20 scrambles using the cable system's scrambling method, if desired, and modulates the NTSC signals onto an analog 6 MHz FDM channel. The FDM modulation frequencies and scrambling techniques used for the NTSC signals are preferably selected to maintain downward compatibility with analog set-top terminals which may be already deployed at the time of implementation of the full service network.

Application and media programs and services are provided by application and media servers 15 and 16 under the control of addressable controller 14 through digital switch or multiplexer 17, interactive cable gateway 18 and data channel gateways 19 in distribution hubs 4. The programs and services by servers 15 and 16 are preferably provided in MPEG-2 transport stream format. Addressable controller 14 may oversee the distribution of programs and services by servers 15 and 16 by processing requests for programs and services from the set-top terminals, instructing the servers when, how and where to deliver a requested program or service and directing the programs and services through the digital switch or multiplexer 17 to the interactive cable gateway 18 in headend 2 and the data channel gateways 19 in the distribution hubs 4.

Digital switch, or multiplexer 17, connects servers 15 and 16 with addressable controller 14, interactive cable gateway 18 and data channel gateways 19 in distribution hubs 4. Addressable controller 14 provides control signals to servers 15 and 16, set-top terminals 6, BCG 11 and Data Channel Gateways (DCGs) 19. Controller 14 communicates with DCGs 19 and set-top terminals 6 via Internet Protocol (IP) datagrams through Forward (in the direction towards set-top terminals 6) and Reverse (in the direction towards headend 2) data channels.

Because the programs and services provided by the application servers 15 typically do not require high bandwidth, these servers may be connected to digital switch or multiplexer 17 directly (as shown), or via intermediate networks. Media servers 16, however, do require a great deal of bandwidth, and accordingly are best connected to digital switch or multiplexer 17 directly. Furthermore, to achieve the high bandwidth requirement, media servers 16 should incorporate disk drives utilizing interfaces achieving at least the speeds of SCSI Fast and SCSI wide interfaces, with Ultra SCSI and Fiber Channel interfaces being preferred.

Interactive Cable Gateway (ICG) 18 processes the servers' signals so that they may be transmitted over the cable system's communication network. Signals from servers 15 and 16 received at ICG 18 through digital switch or multiplexer 17 are encrypted, if desired, subjected to Forward error correction (FEC), if desired, and modulated onto a 6 MHz FAT channel using 64 or 256 Quadrature Amplitude Modulation.

The analog channels, forward application transport channels, forward data channels and reverse data channels are transmitted between the cable headend and the set-top terminals over the cable system's communication network. As shown in FIG. 2, Fiber Transport 3 connects headend 2 to distribution hubs 4. Fiber Transport 3 is a ring of fiber optic cable connecting multiple distribution hubs 4 to a headend 2. Six strands in the fiber optic cable of Fiber Transport 3 are usually dedicated to each hub 4 on the ring and each hub is typically within twenty miles of the headend 2. In cases in which hub 4 is more than twenty miles from headend 2, an intermediate hub 4 may be used to repeat the signals in Fiber Transport 3. By utilizing a ring of Fiber Transport 3, no distribution hub 4 is cut off from headend 2 by a single break in fiber transport 3.

Hybrid Fiber Coax Plants 5 connect distribution hubs 4 to set-top terminals 6. Plants 5 comprise a network of fiber optic cables 25, a plurality of nodes 26, and a plurality of coaxial cables 27. A plurality of Radio Frequency (RF) amplifiers (not shown) may also be required in intermittent spacing throughout coaxial cables 27 to compensate for losses which occur when the coaxial cable is split to connect each set-top terminal. Nodes 26 convert the optical signals in fiber optic cables 25 from the distribution hub 4 into electrical signals for transmission on coaxial cables 27 to set-top terminals 6. Return signals from set-top terminals 6 on coaxial cables 27 are converted to optical signals by nodes 26 for transmission in fiber optic cables 25 to distribution hubs 4.

As shown in FIG. 1, each hub 4 comprises a plurality of Data Channel Gateways 19 which support the Forward and Reverse Data Channels between hubs 2 and set-top terminals 6. The signals in Forward and Reverse Data Channels between headend 2 and DCGs 19 are Internet Protocol datagrams. Between DCGs 19 and set-top terminals 6 these Internet Protocol datagrams may be encrypted and decrypted, if desired, and QPSK modulated and demodulated. Accordingly, the Data Channel Gateways 19 include routing, encryption, decryption, QPSK modulation, and QPSK demodulation functions.

Referring to FIG. 3, one embodiment of set-top terminals 6 used in the full service network is illustrated. As shown, a set-top terminal 6 comprises a Central Processing Unit (CPU) 30, a Memory Management Unit (MMU) 31, a Unified Memory Architecture (UMA) 32 comprising ROM, NVRAM, Flash ROM, and DRAM, an MPEG decompression unit 33, an NTSC descramble unit 34, an IP router 35, a security unit 36, a QAM 64/256 demodulator 37, an NTSC decoder 38, a QPSK demodulate unit 39, a QPSK modulate unit 40, a first tuner 41, a second tuner 42, a transmitter 43, and NTSC encoder 44, an RF output 45, a graphics subsystem 46, an S-Video output 47, a baseband video output 48, an audio subsystem 49, an AC-3 audio output 50, a baseband audio output 51, an I/O subsystem 52, a keypad 53, an LED display 54, an IR receiver 55, an IR transmitter 56, an accessories bus interface 57, and a 10-base-T interface 58.

Controlling the operation of set-top terminal 6 is Central Processing Unit 30. Preferably, CPU 30 is a processor that can support 32-bit arithmetic and logical operations that can operate at speeds of at least 25 MIPs, and that supports a system of dynamically prioritizable hardware and software interrupts. An example of a suitable processor for CPU 30 is the SUN MicroSystems Micro-SPARC core. CPU 30 operates by executing instructions stored in Unified Memory Architecture 32 under the control of an operating system such as the Power TV Operating system by Power TV, Inc. of Cupertino, Calif. CPU 30 accesses UMA 32 through Memory Management Unit 31. MMU 31 provides memory protection for application processes and the kernel, and provides a flat address space for user processes.

Memory, or UMA, 32 comprises Read Only Memory (ROM), Flash ROM, Non-Volatile Random Access Memory (NVRAM), and Dynamic RAM (DRAM). ROM is used primarily for the storage of the operating system and application software available at the time of manufacture of set-top terminal 6. At least 1 Mbyte of Read Only Memory should be provided in UMA 32. Flash ROM is used primarily for the storage of resident application software, as well as patches to the operating system and application software. These patches will be downloaded to set-top terminal 6 from headend 2 after the set-top terminal has been deployed in the subscriber's home. At least 1 Mbyte of Flash ROM should be provided in memory 32. NVRAM is used primarily for the storage of settings such as parental control codes, favorite channel line-ups, set-top terminal setups, channel maps, authorization tables, and Forward Data Channel address assignments. At least 2 Kbytes of NVRAM should be provided in UMA 32. Dynamic RAM is used for most application and operating system storage requirements such as the stack, heap, graphics, Interactive Program Guide data, channel map, VCR codes, and marketing data, usage data and functions such as MPEG-2 video decompression, AC-3 audio decoding, and video manipulation. At least four Mbytes of Dynamic RAM should be provided in memory 32.

Frequency Division Multiplexed (FDM) signals from headend 2 are initially received by tuners 41 and 42 through Hybrid Fiber Coax Plant 5. In-band tuner 41 receives program and services transmitted to the set-top terminal on analog channels and Forward Application Transport channels. These programs and services include analog programs and services from analog satellite broadcasts, digital programs and services from digital satellite broadcasts, digital program and services from digital satellite broadcasts, some digital program and services from the application servers, and digital program and services from the media servers. NTSC decoder 38 receives the analog program and services from tuner 41 and produces NTSC baseband signals. QAM 64/256 demodulator 37 receives the digital services from in-band tuner 41 and demodulates the signal into MPEG-2 payloads. Out-of-band tuner 42 receives only incoming IP datagram messages from headend 2 on the Forward Data Channel. Messages which are transmitted from the headend to the set-top terminals in Internet Protocol datagrams on the Forward Data Channel include Interactive Program Guide data messages as well as other data and control messages. These messages are QPSK demodulated by QPSK demodulator 39 to reveal the IP datagrams. The analog NTSC baseband signals, the digital MPEG-2 payloads, and the digital IP datagrams are descrambled (if necessary), decrypted (if necessary) and screened by security unit 36. Additionally, security unit 36 provides encryption, key management, authentication, and secure transaction functions, and prevents downloading of viruses, vandalism of software, theft of services, falsified orders, tampering with the set-top terminal, and direct cloning or re-manufacturing of the set-top terminal.

After descrambling, decryption, and screening by security unit 36, the baseband signals, MPEG-2 payloads, and IP datagrams are passed on to the analog-to-digital converter 34, MPEG-2 decompression unit 33, and IP router 35. As their names imply, A/D converter 34 converts the NTSC baseband signals to digital signals; MPEG-2 decompression unit 33 decompresses the MPEG-2 payloads; and IP router 35 routes the IP datagrams toward their ultimate destination.

Outgoing IP datagram messages are also processed by IP router 35. After routing the outgoing IP datagrams, security unit 36 screens and encrypts the IP datagrams (if necessary). The IP datagrams are then QPSK modulated by QPSK modulator 40 and transmitted to Hybrid Fiber Coax Plant 5 by out-of-band transmitter 43.

The video and audio outputs of set-top terminal 6 are generated by NTSC encoder 44, graphics subsystem 46, audio subsystem 49 and RF modulator 61. NTSC encoder 44 generates S-Video output 47 and baseband video output 48 from digitized MPEG-2 and NTSC video. Graphics subsystem 46 produces graphic images and scales MPEG-2 and NTSC video. Audio subsystem 49 produces the audio outputs for set-top terminal 6 including AC-3 audio output 50 and baseband audio output 51. RF modulator 61 generates NTSC RF output 45 necessary to drive a television without S-Video or baseband inputs from signals received from NTSC encoder 44 and audio subsystem 49.

I/O subsystem 52 controls the input and output controls and the 10-base-T interface 58 for set-top terminal 6. As shown in FIG. 3, I/O subsystem 52 receives inputs from keypad 53, I/R receiver 55, accessories bus 57, and 10-base-T interface 58. I/O subsystem 52 also produces outputs to LED display 54, I/R transmitter 56, accessories bus 57 and 10-base-T interface 58. Keypad 53 enables the user to control set-top terminal 6 without requiring the use of a remote control 59. LED display 54 provides a numeric display for channel or time indication, and a plurality of single LEDs to indicate status such as power on, message waiting, set-top output disabled, etc. I/R receiver 54 is used to receive and digitize input from remote control 59. I/R transmitter 56 is used to control a VCR 60 or send updates to remote control 59. Accessories bus 57 is used to connect to external equipment such as a keyboard, joystick, mouse, I/R transmitter, etc. The 10-base-T interface can be used to connect to Ethernet interfaces in equipment such as routers, personal computers, or home entertainment equipment.

In this full service network, it would be desirable to provide an improved media server interconnect from the headend to the set-tops so as to provide more on-demand service versatility and capacity at reasonable cost.

SUMMARY OF THE INVENTION

In accordance with this invention an improved media server interconnect to subscriber terminals is accomplished with a plurality of media servers at a headend where each media server provides one or more on-demand programs or services for distribution to the subscriber terminals. An array of modulators connects a requested media asset, such as a video program, WEB page, etc., from a media server to a requesting subscriber terminal. A connection manager responds to a media asset request from the requesting subscriber terminal and selects a source server to provide the requested media asset and selects a modulator in the array to send the requested media asset from the source server to the requesting subscriber terminal.

In another feature of the invention, the array of modulators acts as a two stage switch between the source server and the requesting subscriber terminal. A selected modulator in said array is the switch point in the two stage switch. The connection manager controls a first stage of the switch by selecting the selected modulator to receive the requested media asset from the source server. The requesting subscriber terminal acts as a second stage of the two stage switch also under the control of the connection manager by tuning to the channel frequency of the selected modulator.

In another feature of the invention, the connection manager allocates a program identifier to the requested media asset and notifies the subscriber terminal of the program identifier. The source media server sends the requested media asset as digital data packets. The source media server inserts the program identifier in each digital data packet of the requested media asset. The requesting subscriber terminal, responds to the program identifier in the digital data packets and extracts the digital data packets of the requested media asset from a data stream received from the selected modulator.

In another feature of the invention, the array, or matrix of modulators, is a rectangular array of modulators. Each modulator in a row of modulators in the rectangular array receives a media asset from a media server linked to the modulator, and each modulator in a row modulates at the same frequency a number of media assets from the media server. Each modulator in a column of modulators in the rectangular array modulates at a different frequency a media asset from its media server. A node group combiner combines all of the modulated media assets from a column of modulators for distribution to a predefined set of subscriber terminals. The pre-defined set of subscriber terminals is a node group of subscriber terminals. In one embodiment, each modulator in a row is linked in parallel to the media server for the row. In another preferred embodiment, each modulator in a row is linked in series to the media server for the row. In the latter embodiment, the connection manager allocates a program identifier to the requested media asset and notifies a selected modulator in the row of the program identifier. The selected modulator responds to the program identifier, extracts the digital data packets and modulates the digital data packet of the requested media asset for transmission to the requesting subscriber terminal.

One great advantage and utility of the present invention is the ease with which the capacity of the system to deliver on-demand programs and services may be changed. Also, the present invention is much less complex than prior media delivery systems providing the same services. The foregoing and other features, utilities and advantages of the invention will be apparent from the following more particular description of a preferred embodiment of the invention as illustrated in the accompany drawings.

DESCRIPTION OF THE PREFERRED EMBODIMENTS

Figure 1:
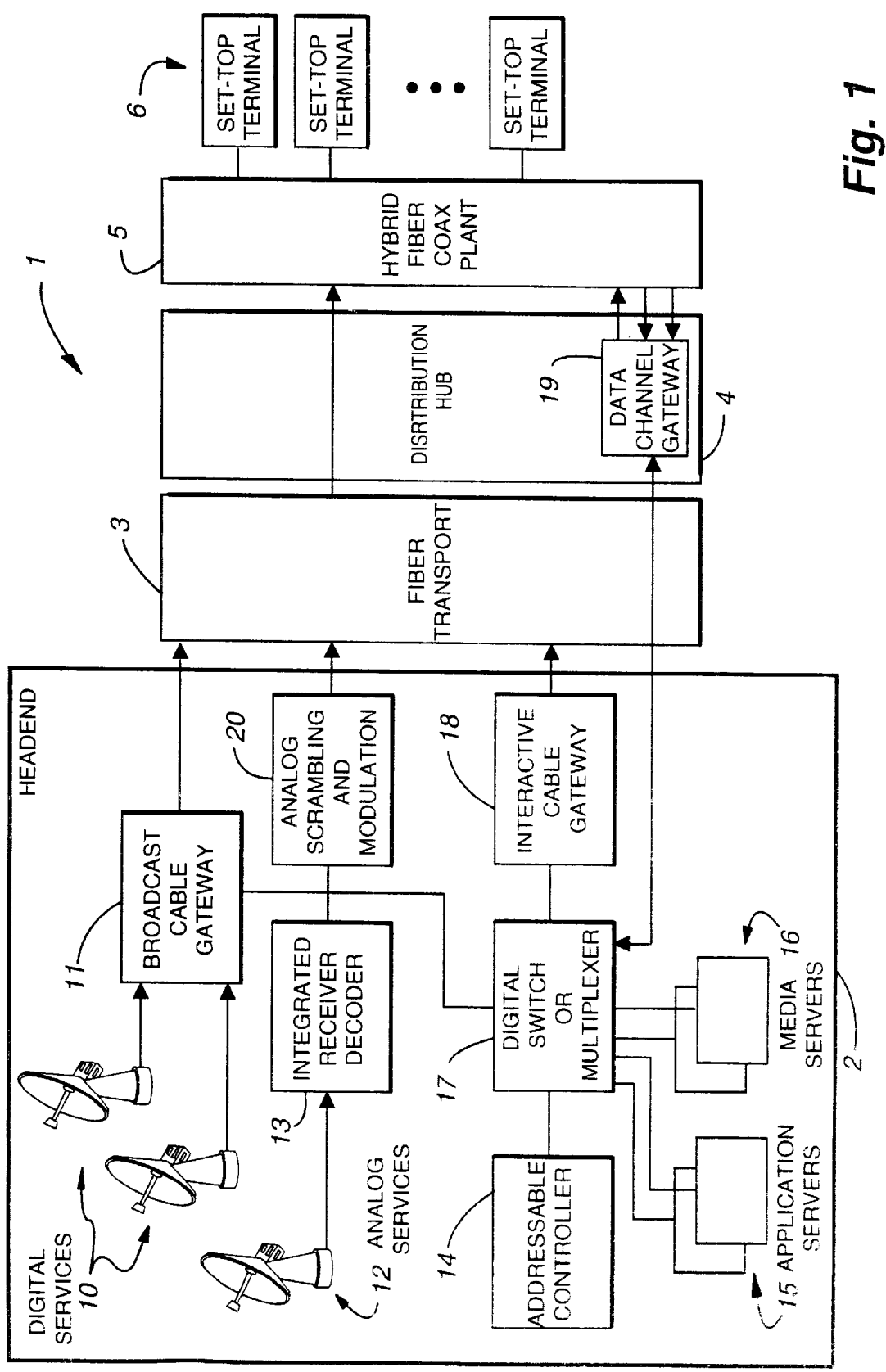
FIG. 1 shows a full service network for providing entertainment and information services to subscribers.
Figure 2:
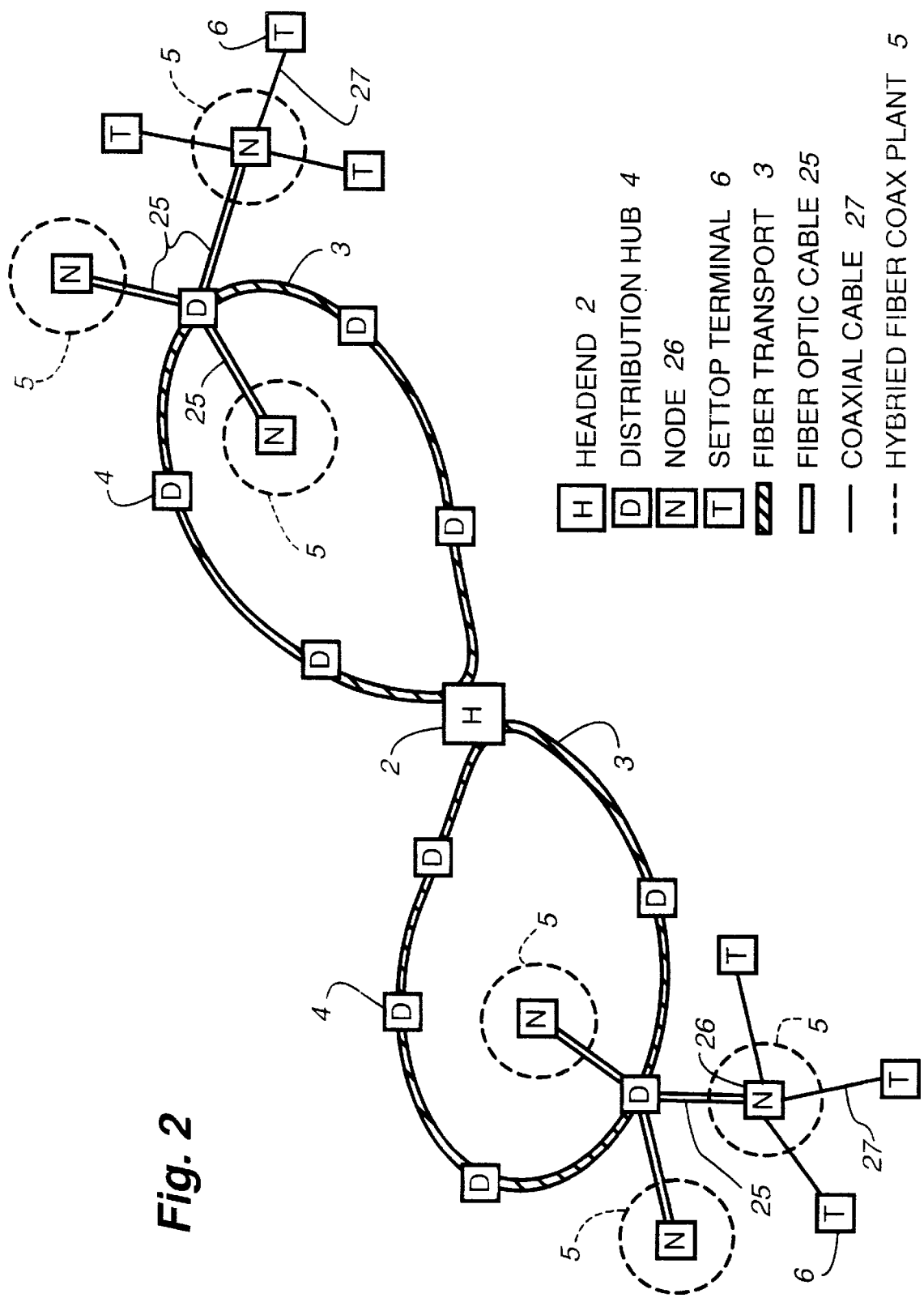
FIG. 2 is an example of a fiber-optical/coax cable system interconnecting the elements of the full service network.
Figure 3:
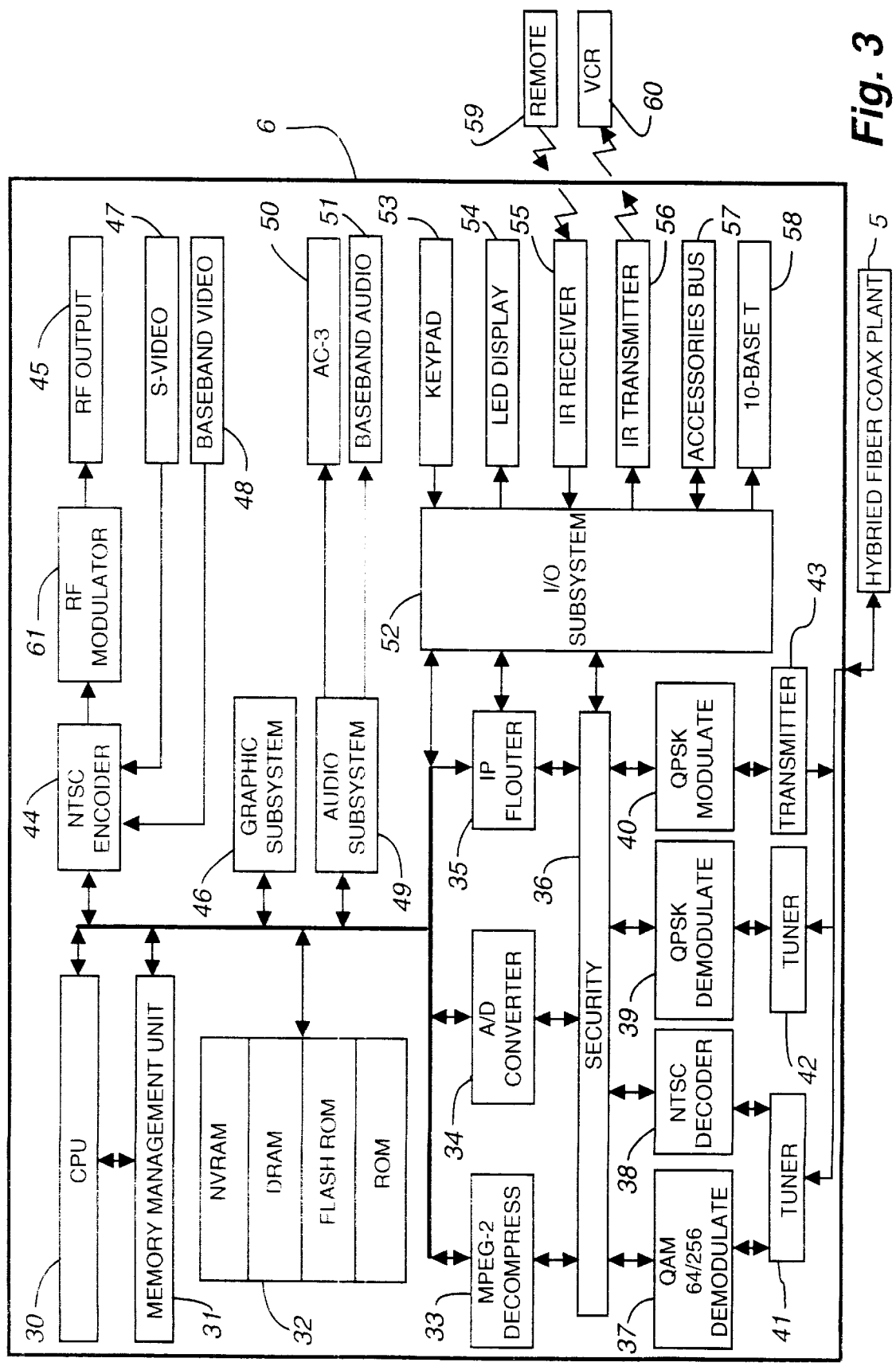
FIG. 3 is a detailed illustration of a set-top terminal used in the networks of FIG. 1 and FIG. 2.
Figure 4:
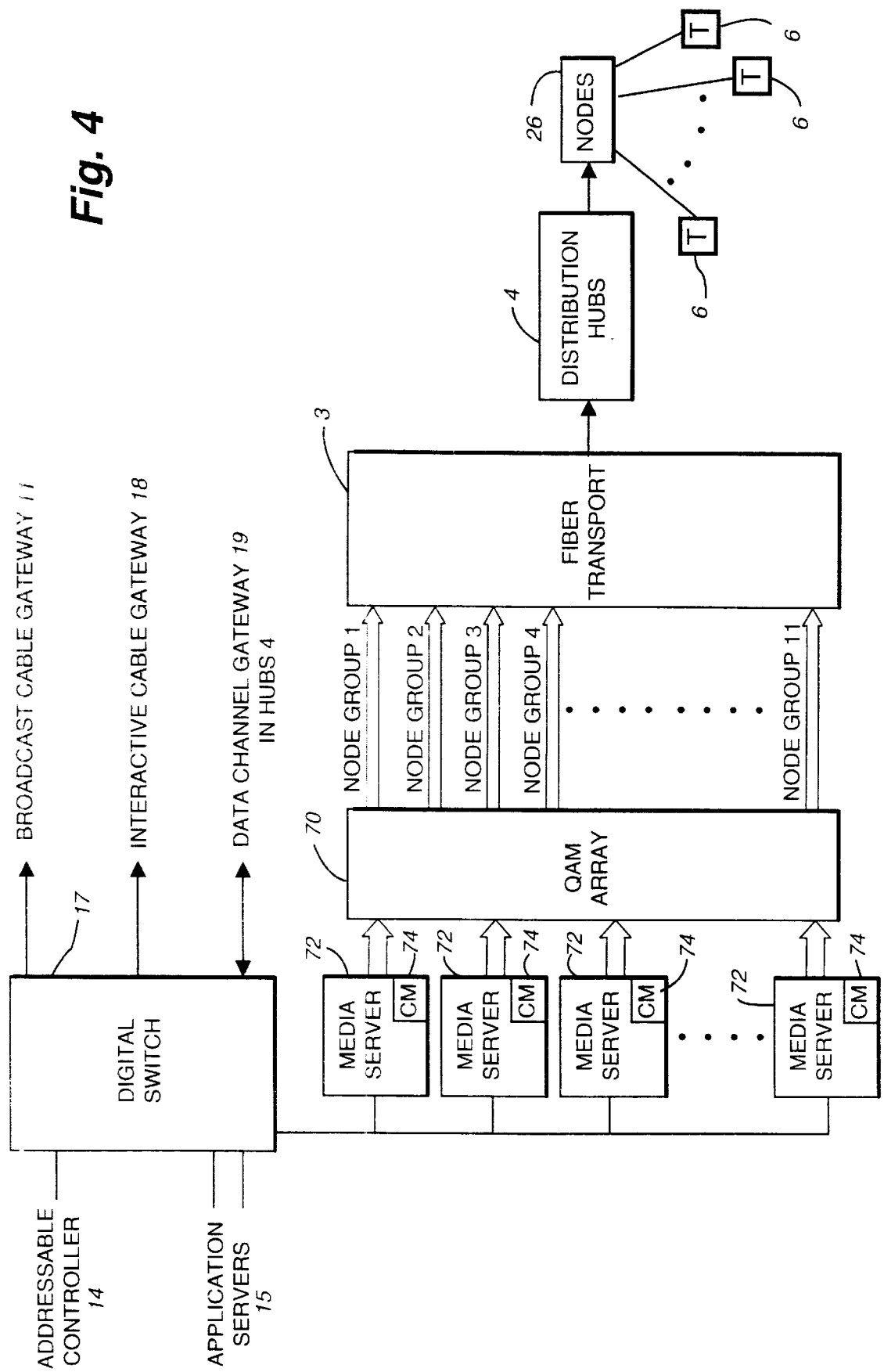
FIG. 4 illustrates one preferred embodiment of invention showing a plurality of media servers delivering media asset signals to a modulator array which in turn connects the media asset signals to node groups of subscriber terminals.

In the preferred embodiment of the invention. as shown in FIG. 4, a modulator array 70 provides the server interconnect of media asset signals from the media servers 72 to the fiber transport 3 for distribution to nodes 26 of set-top terminals 6. In FIG. 4, elements common to FIGS. 1 and 2 are given the same reference numerals. Thus, the server interconnect of the present invention may be used in the full service network of FIGS. 1 and 2, when modified as shown in FIG. 4.

The modulator array operates with the subscriber terminals as a distributed two-stage switch to connect any media server 72 to any subscriber terminal 6. The first stage is the selection of a modulator in the modulator array 70 to receive a media or media asset input from a media server 72. The second stage is the selection of a modulator (by tuning to a channel or frequency) in the modulator array by the subscriber terminal 6 to receive the media asset. The modulator selected by a given media server 72 and a given subscriber terminal 6 is effectively the switch point in a two dimensional array of switch points provided by the modulator array. The selection of server-to-modulator connection and subscriber terminal-to-modulator connection is performed by a connection management agent 74 in each media server 72 communicating with the subscriber terminal and the other connection management agents in the other media servers.

Modulator array 70, as will be described hereinafter with reference to FIGS. 5 and 6, includes an array of modulators and a plurality of node group combiners. The combiners combine signals from a set of modulators and connect that set of modulators to a node group. The node group includes a predetermined number of subscriber terminals and one or more nodes 26. A given subscriber terminal is in only one node group. All subscriber terminals can receive a program from any one of the media servers 72. Connection management agents 74 in media servers 72 send and receive control information or messages in the form of IP datagrams through digital switch 17 and interactive control gateway 19. All media assets provided by the media servers 16 go through the modulator array 70 to the subscriber terminals 6. The media assets do not go through digital switch 17 and ICG 18, as was previously done in FIG. 1. Accordingly, digital switch 17 and interactive control gateway 18 are no longer required. Further, the modulator array 70, which is implemented in one preferred embodiment with QAM modulators and combiner circuits contains components which are much cheaper than the components in the digital switch 17 and the interactive control gateway 18.

Figure 5:
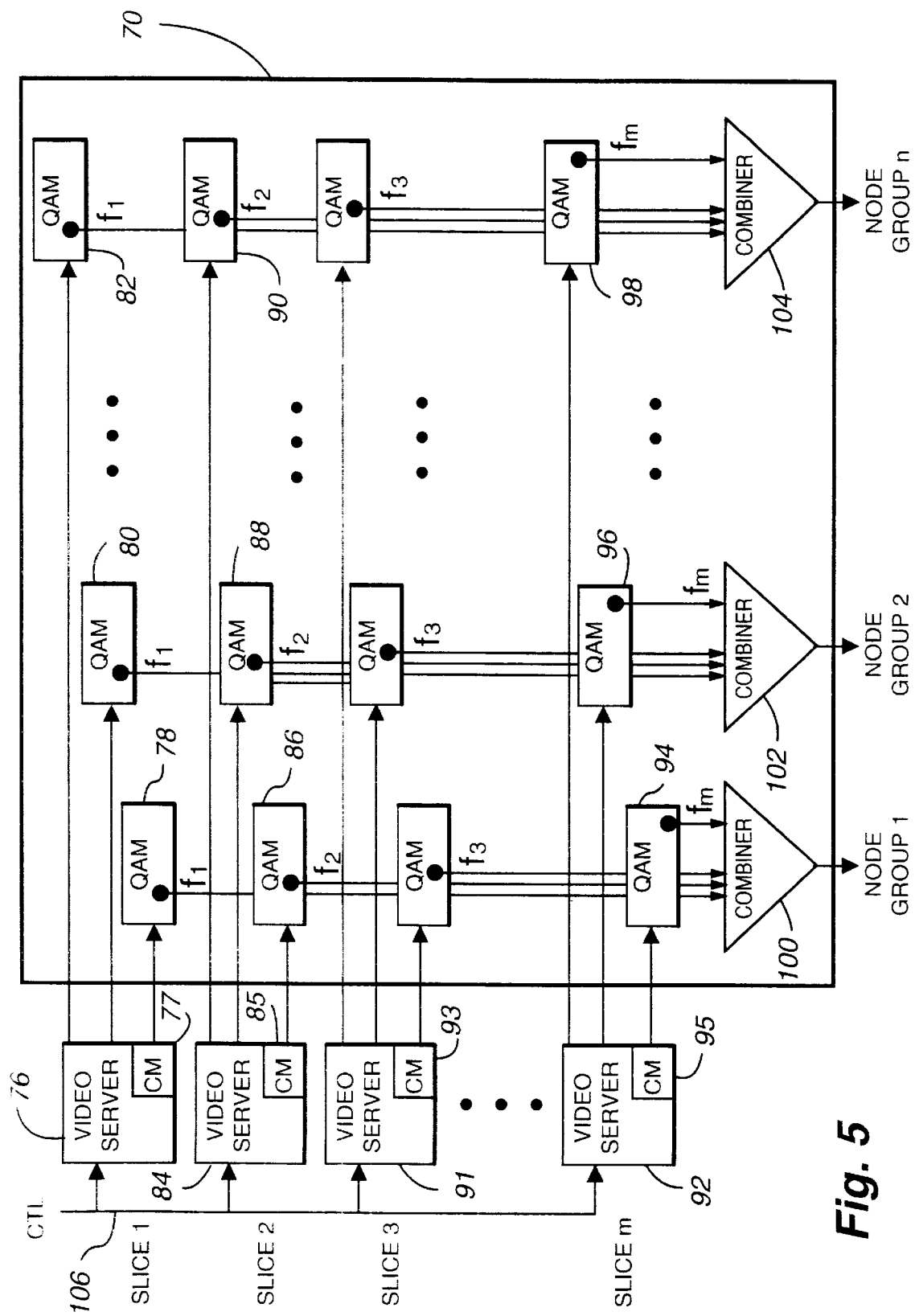
FIG. 5 shows one preferred embodiment of the modulator array in FIG. 4.

One preferred embodiment of the modulator array 70 is illustrated in FIG. 5. The media servers 72 in FIG. 4 are depicted as video servers 76 in FIG. 5. However, it should be understood that many different types of the media asset will be distributed from the servers through the modulator array 70 in support of on-demand service, the typical media asset will be MPEG-2 encoded video and audio, MPEG-2 encoded still images, WEB pages, bit-mapped graphic images, PCM digital audio, application programs, and application data files.

In FIG. 5, modulator array 70 in the preferred embodiment is made up of a plurality of rows of QAM modulators. Each row is referred to as a slice or a set, and all modulator in set modulate at the same channel frequency and modulate an MPEG-2 formatted data packet from a single server. Modulated signals from a column of modulators in the modulator array are collected for transmission over an interactive FAT channel by a combiner for a given node group of subscriber terminals.

Video, or media, server 76 provides a selected media asset to each of the modulators 78, 80 and 82 in slice 1 of array 70. All modulators in a slice, or set, are linked in parallel to the media server for that set. A different media asset may be provided to each of the modulators 78, 80 and 82. The media assets are provided in the form of digital data packets, and an MPEG program number is attached to each data packet to identify the media asset contained in the data packet. Similarly, media server 84 sends the same or different media asset to each of the modulators 86, 88 and 90 making up slice 2 of the modulator array 70. All of the modulator in slice 2 are modulating media data packets at the same frequency, $f_2$, which is a different frequency from the modulators in slice 1. There may be any number of slices, i.e., sets or rows of QAM modulators in the modulator array 70. All modulators in the same set modulate at the same frequency, and each set of modulators modulates at a different frequency from the other sets of modulators. As depicted in FIG. 5, "slice m" with media server 92 and modulator 94, 96 and 98 modulating media data packets at frequency, $f_m$, makes up the last set or slice.

Node group combiners 100, 102 and 104 collect, or combine, the modulated data packet signals from one modulator in each slice, i.e. all modulator in a column of the rectangular array 70. There may be any number of channels (frequencies) combined by a node group combiner. The number of slices, m, corresponds to the number of channels m allocated for the media servers to provide programs to the subscriber terminals.

The number of node group combiners, and thus the number of columns in the modulator array 70, depends upon the number of subscriber terminals to be served. The size of a node group, i.e. the number of subscriber terminals in a node group, depends upon the viewing demands of the subscribers in the network. A node group might typically include 20 nodes with 40 or 50 subscriber terminals connected to each node. The number of nodes in a node group and the number of subscriber terminals attached to each node is highly variable and depends upon the capacity of the communication components in the network. The size of a node group forms no part of the invention. However, what is a part of the invention is the ease with which the capacity of interconnection between servers and subscriber terminals may be increased. Node groups may be added by simply adding another column to the modulator array 70. On-demand capacity to each node group may simply be increased by adding another slice, i.e., row, to the modulator array 70. In either case, this may be accomplished by with little, or no, disruption to service to existing subscribers.

Each of the media servers 76, 84, 91, and 92 contains a connection management agent 77, 85, 93 and 95 respectively. These connection management agents communicate with each other through control bus 106. The control bus 106 also connects to digital switch 17 so that the connection management agents may exchange control messages (IP datagrams) with the subscriber terminals. The operation of connection management agents will be described hereinafter with reference to FIG. 7.

Figure 6:
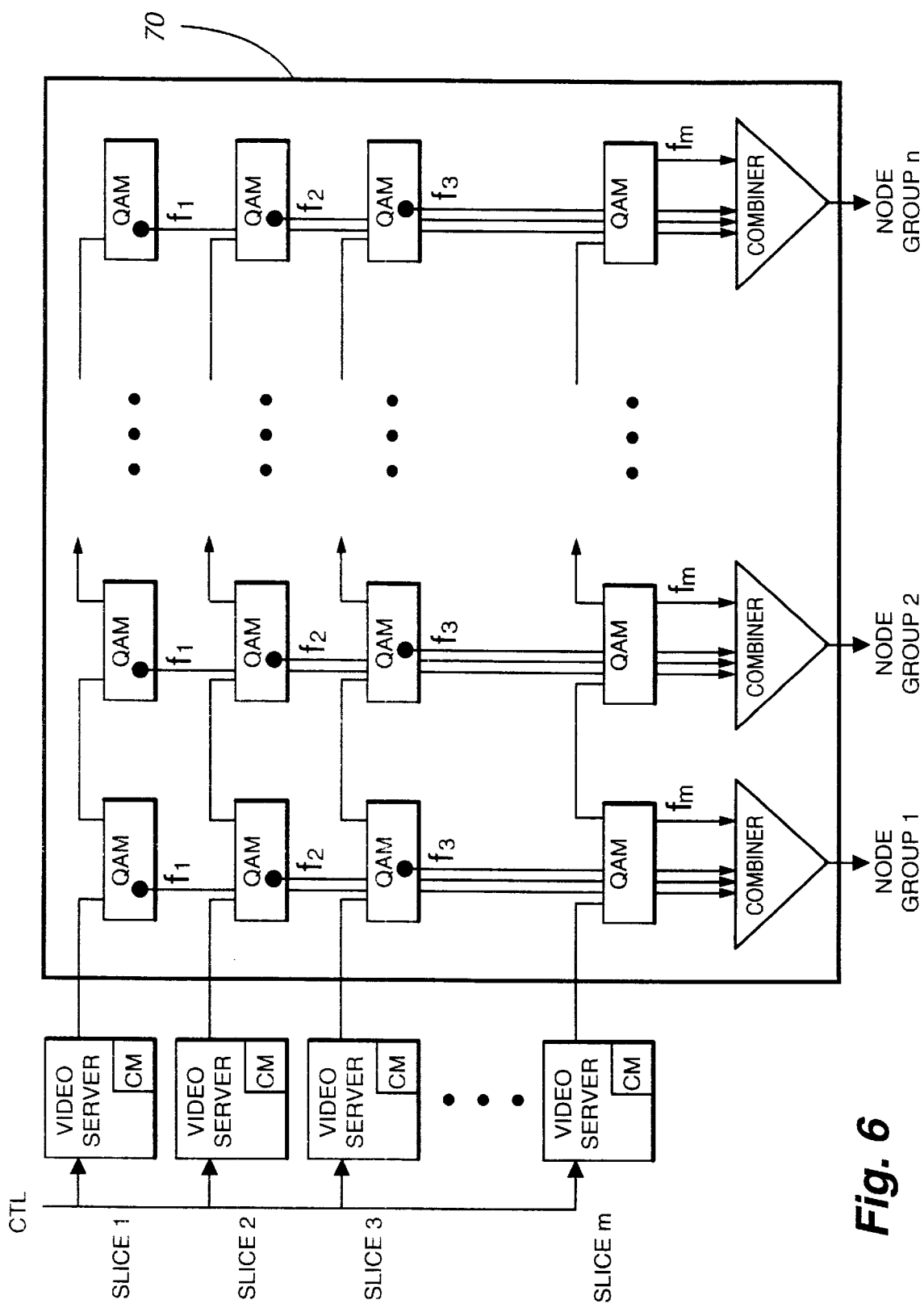
FIG. 6 shows another preferred embodiment of the modulator array in FIG. 4 using Digital Video Broadcast (DVB) standard Asynchronous Interface (ASI) between media servers and modulator.

Another preferred embodiment of the invention is illustrated in FIG. 6. The difference between the embodiments of the invention in FIGS. 5 and 6 is that in FIG. 6, the modulators in each slice, or set, are serially connected or daisy-chained to one video or media server. Each modulator in a set is linked or connected in series with the other modulators in the set to their media server using the Digital Video Broadcast Asynchronous Interface (DVB ASI). The digital data packets for each media asset from the media server are time multiplexed on this serial link from the server to the modulator in the slice. Each data packet is marked with the MPEG program number, or media asset identifier, that identifies the media asset being carried by the data packet. Each modulator in the slice reads the MPEG number in the digital data packets in the data stream and extracts the digital data packet that is to be modulated by the modulator. A control signal goes from the media server to each modulator notifying the modulator of the MPEG number of data packets that it is to modulate. Otherwise, the operations of the server interconnection to node groups by array 70 in FIGS. 5 and 6 are the same. In summary, the media servers select a modulator for each media asset, and each slice, or set, uses, modulators at a different channel frequency. The column of modulator is collected by a node group combiner so that any subscriber terminal in a node group may select a program being provided from any server.

Figure 7:
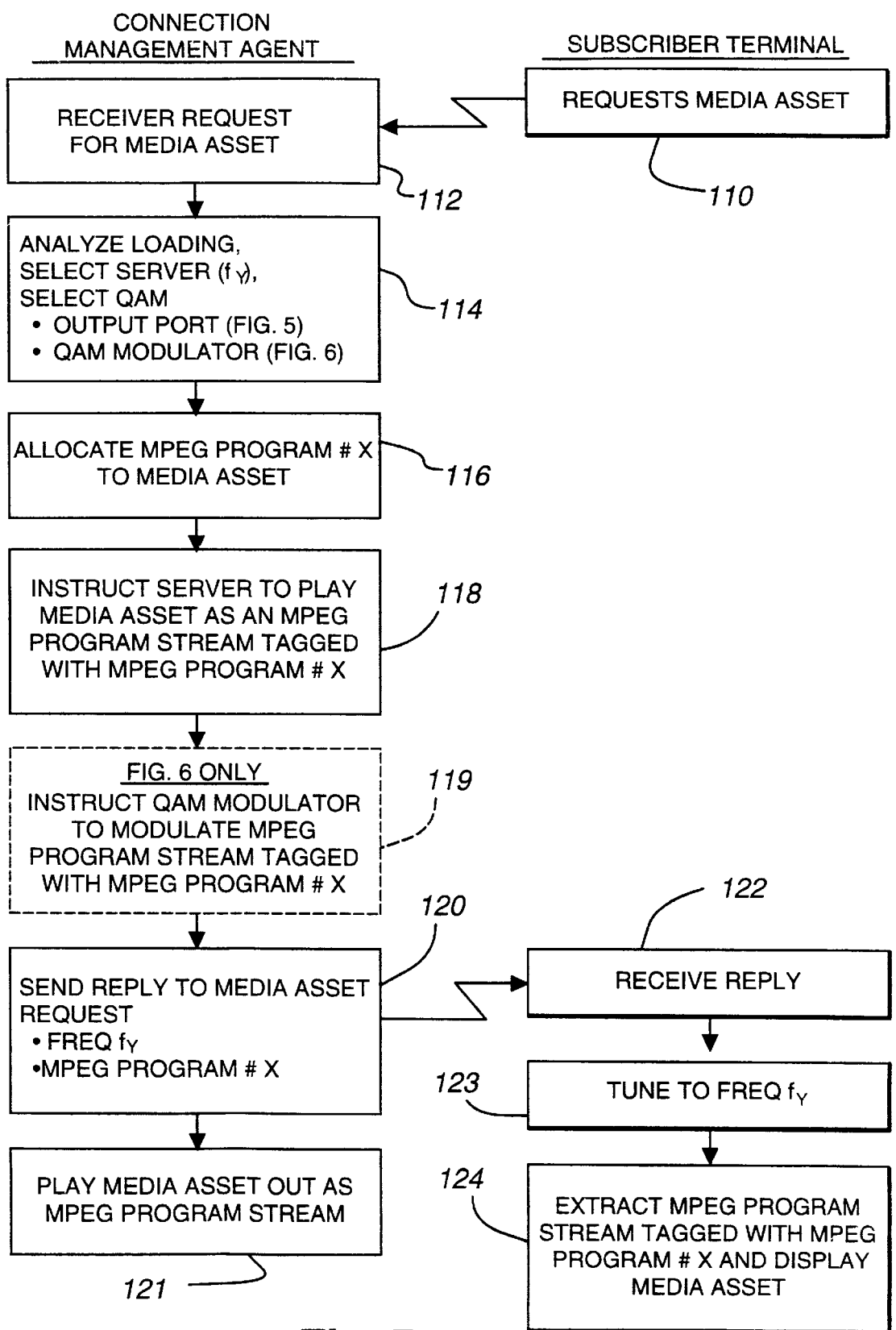
FIG. 7 illustrates the process flow of control operations between subscriber terminals and connection management agents in the media servers in the preferred embodiments of the invention.

The operation of the connection management agents with the subscriber terminals, to provide a requested media asset to a requesting subscriber terminal is shown in the logical operations of FIG. 7. The operations in the left column of FIG. 7 are performed by the connection management agent and the operations in the right column are performed by a given subscriber terminal requesting a particular media asset. The logical operation begins with the subscriber terminal in operation 110 requesting a media asset, such as a video program, or web page, and sending this request as an Internet protocol datagram over a reverse data channel back through the ICG 18 to digital switch 17 to the connection management agents 74 (FIG. 4). Each connection management agent receives the request for the media asset at receive module 112. Analysis operation 114 analyzes availability of the media asset at its. server and the loading, or workload, of the various media servers in the network.

Each media server computing system 72, when running the connection management agent, maintains a media server utilization table indicating the utilization of each media server 72. Each connection management agent 74 in each server 72 updates entries in this table for its server, the updates are transmitted and received by the other agents and used to update their media server utilization table. Accordingly, analysis operation 114 first identifies whether the requested media asset is available at its server. If it is not, this connection management agent cannot reply to the request from the subscriber terminal. The connection management agents in the set of servers, where the media asset is available, identify a subset of servers with the available program that, in addition, have available modulator bandwidth, i.e. modulators, for providing the media asset to the subscriber terminal. Next, in this subset of servers, the connection management agents identify the server with the modulator that is least loaded, i.e. smallest workload, by the current demands on the network.

Based on this internal process, the analysis operation 114 then selects a server and a modulator communicating with the node group containing the subscriber terminal. The selection of a server defines the frequency, $f_y$, that the media asset will be transmitted on, since all modulators for a given server use the same modulation frequency. In the embodiment of FIG. 5, selecting a modulator is accomplished by selecting a server output port connected to that QAM modulator. In the embodiment of FIG. 6, selecting a modulator is accomplished by identifying a modulator that will be subsequently instructed in operation 119 to operate on the MPEG program stream.

Operation 116 allocates a media asset identifier, or an MPEG program number, #X, to the requested media asset. This MPEG program number is a program identifier; it allows the subscriber terminal to identify the required PIDs (Packet IDentifiers) using the MPEG Program Specific Information (PSI) transmitted with each data packet of the media asset as the media asset is transmitted. Instruct server operation 118 in the connection management agent instructs the server that when it plays the media asset it is to be played as an MPEG program, or media asset, stream tagged with the allocated MPEG program number from allocation operation 116.

Instruct modulator operation 119 is only executed in the embodiment of FIG. 6. Operation 119 sends a message to the modulator selected in operation 114. The message contains the allocated MPEG program #X and instructs the modulator to modulate the MPEG program stream tagged with MPEG program #X. In this way, the appropriate MPEG program stream is switched for transmission to the node group containing the subscriber terminal.

Reply operation 120 in the connection management agent in the selected server sends a reply message to the subscriber terminal requesting the media asset. The reply message contains the allocated MPEG program number, #X, and the channel frequency, $f_y$, for receiving the requested media asset. This reply is passed over control bus 106 to the switch 17 through the DCG 19 and out over the network through the hubs, through the nodes and to the subscriber terminal.

The connection management agent in operation 121 begins to play the media asset out from the server as an MPEG-2 program stream. The string of digital data packets for the requested media asset are tagged with the MPEG program number #X. These data packets are sent to the selected modulator in the node group for the subscriber terminal.

At the subscriber terminal, the reply from the connection management agent is received at operation 122. The subscriber terminal now knows that it must tune to the selected channel frequency, $f_y$, and look for data packets with the allocated MPEG program number, #X. The subscriber terminal in operation 123 tunes to frequency, $f_y$, to receive the MPEG program stream on that frequency. Extract operation 124 looks for an MPEG program stream tagged with MPEG program #X. When the tag is found, the MPEG program stream so tagged is extracted. Operation 124 then displays the media asset requested by the terminal subscriber which is now being received in the tagged MPEG program stream.

While a plurality of embodiments for implementing the invention have been described, it will be appreciated that any number of additional variations or alterations in the elements used to implement the invention may be made and are within the scope of the invention as claimed hereinafter.

What is claimed is:

1. Apparatus for interconnecting media server to subscriber terminals in a system having a headend and a distribution network, a plurality of media servers connected at the headend, and a plurality of subscriber terminals connected to the network, a requesting subscriber terminal requesting a media asset from the media servers, said apparatus comprising:

each media server providing one or more media assets for distribution to the subscriber terminals;

a two-dimensional array of modulators modulating requested media assets provided by the media servers;

a plurality of sets of modulators in the array, a media server linked to each set of modulators, each modulator in a set modulates at the same frequency a media asset from the media server linked to the set, and each set of modulators modulates at a different frequency from other sets of modulators in the array;

a connection manager, responsive to a media asset request from the requesting subscriber terminal, selecting a media server as a source media server to provide the requested media asset and selecting a modulator from the set of modulators linked to the source media server to modulate the requested media asset for transmission to the requesting subscriber terminal through a combiner for a group of subscriber terminals containing the requesting subscriber terminal; and said combiner combining all of the modulated media assets from each of the sets of modulators for distribution to a pre-defined group of subscriber terminals.

2. The apparatus of claim 1 wherein each modulator in a set is linked in parallel with other modulators in the set to the media server for the set.

3. The apparatus of claim 1 wherein:

each modulator in a set is linked in series with other modulators in the set to the media server for the set;

said source media server sends the requested media asset as digital data packets;

said connection manager tags a program number to the requested media asset and notifies the selected modulator in the set of the program number; and said selected modulator, responsive to the program number, for modulating the digital data packet of the requested media asset for transmission to the requesting subscriber terminal.

4. The apparatus of claim 3 comprises in addition:

said requesting subscriber terminal tuning to the frequency of the set of modulators linked to the source media server.

5. The apparatus of claim 4 comprises in addition:

said connection manager tags a program number to the requested media asset; and said requesting subscriber terminal displaying a media asset tagged with the program number received on the frequency of the set of modulators linked to the source media server whereby the requested media asset is delivered to the requesting subscriber terminal.

6. An apparatus for interconnecting media servers to subscriber terminals in a system having a headend and a distribution network with a plurality of subscriber terminals connected to the network, the apparatus comprising:

a plurality of media servers at the headend, each media server providing multiple media assets in a time division multiplexed signal for distribution to the subscriber terminals;

a plurality of frequency modulators receptive of the time division multiplexed signals from the media servers and providing a subset of the media assets in the time division signals as a frequency modulated signal, wherein the plurality of frequency modulators are virtually aligned in a two-dimensional array of rows and columns of frequency modulators, and further wherein each of the plurality of media servers is associated with a particular row of the virtual array of frequency modulators by the time division multiplexed signal from each media server being supplied to each of the frequency modulators within a particular row and each of the subscriber terminals is associated with a particular column of the virtual array of frequency modulators by the frequency modulated signals from each of the frequency modulators in the particular column being sent to the requesting subscriber terminal; and a connection manager that, in response to a media asset request from the requesting subscriber terminal, selects a source media server from the plurality of media servers to provide the requested media asset, selects a frequency modulator from the plurality of frequency modulators, and selects the requested media asset in the time division multiplexed signal provided by the selected source media server to be provided in the subset of media assets in the frequency modulated signal from the selected frequency modulator in order to send the requested media asset from the source media server to the requesting subscriber terminal.

7. An apparatus as defined in claim 6, wherein each of the frequency modulators in a particular row operate at a given frequency with that given frequency being different than the given frequencies of the frequency modulators in each other row of the virtual array of frequency modulators.

8. Apparatus for interconnecting a source media server to a requesting subscriber terminal in a system having a headend and a distribution network, and plurality of subscriber terminals being connected to the network, said apparatus comprising:

a plurality N of media servers at the headend, each media server providing one or more media assets for distribution to the subscriber terminals;

a plurality N×M of modulators selectively operating to connect a requested media asset from a source media server to a requesting subscriber terminal;

a connection manager, responsive to a media asset request from a requesting subscriber terminal, selecting a source media server from the plurality of media servers, and selecting a modulator from the plurality of modulators, to thereby send the requested media asset from the source media server to the requesting subscriber terminal;

said plurality N×M of modulators comprising a rectangular array of modulators having the integer number N of rows and the integer number M of columns;

each of the M modulators in a row of modulators receiving the same media asset from a common one of the N media server, and each of the M modulators in a row of modulators modulating at the same frequency;

each of the N modulators in a column of modulators receiving a different media asset from different ones of the N media servers, and each of the N modulators in each column of modulators modulating a different frequency, and a plurality M of combiners, each combiner connected to a different one of the modulators that are within a common column of modulators, each combiner combining modulated media assets from each modulator within the common column of modulators, the modulated media assets being distributed to M pre-defined sets of subscriber terminals, each pre-defined set of subscriber terminals being connected to a different one of the combiners.

9. Apparatus for interconnecting media servers to subscriber terminals in a system having a headend, a distribution network, and a plurality of subscriber terminals connected to the network, said apparatus comprising:

a plurality of media servers at the headend, each media server providing one or more media assets for distribution to the subscriber terminals;

a rectangular array of modulators connecting a requested media asset from a media server to a requesting subscriber terminal;

a connection manager, responsive to a media asset request from a requesting subscriber terminal, selecting a source media server from the plurality of media servers to provide the requested media asset, and selecting a modulator from the array of modulators to send a requested media asset from the source media server to the requesting subscriber terminal, each modulator in a row of modulators in the rectangular array receiving a media asset from the source media server, and each modulator in a row of modulators modulating at the same frequency a media asset from the source media server;

each modulator in a column of modulators in the rectangular array modulating at a different frequency a media asset from a media server;

a combiner combining all of the modulated media assets from a column of modulators for distribution to a pre-defined set of subscriber terminals;

each modulator in a row being linked in series with other modulators in the row to a media server for the row;

said source media server sending the requested media asset as digital data packets;

said connection manager allocating a program identifier to the requested media asset and notifying a selected modulator in a row of the program identifier; and said selected modulator, responsive to the program identifier, modulating the digital data packets of the requested media asset for transmission to the requesting subscriber terminal.

10. The apparatus of claim 8 wherein each pre-defined set of subscriber terminals is a node group of subscriber terminals.

11. The apparatus of claim 8 wherein each modulator within a given row is linked in parallel with other modulators in the given row to a media server for the given row.

* * * * *